United States Patent
Rao et al.

(10) Patent No.: US 12,253,847 B2
(45) Date of Patent: Mar. 18, 2025

(54) PLANT MONITORING AND CONTROL SYSTEM

(71) Applicant: TOSHIBA MITSUBISHI-ELECTRIC INDUSTRIAL SYSTEMS CORPORATION, Tokyo (JP)

(72) Inventors: Vittal Rao, Tokyo (JP); Akira Nojima, Tokyo (JP); Nobuo Shimizu, Tokyo (JP); Ryo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 384 days.

(21) Appl. No.: 17/756,728

(22) PCT Filed: Nov. 24, 2020

(86) PCT No.: PCT/JP2020/043655
§ 371 (c)(1),
(2) Date: Jun. 1, 2022

(87) PCT Pub. No.: WO2022/113168
PCT Pub. Date: Jun. 2, 2022

(65) Prior Publication Data
US 2023/0236584 A1    Jul. 27, 2023

(51) Int. Cl.
*G05B 19/418*    (2006.01)
(52) U.S. Cl.
CPC .............. *G05B 19/41865* (2013.01); *G05B 2219/50185* (2013.01)
(58) Field of Classification Search
None
See application file for complete search history.

(56) References Cited

U.S. PATENT DOCUMENTS

| | | | |
|---|---|---|---|
| 2007/0088528 A1* | 4/2007 | Miller | G05B 23/024 702/185 |
| 2010/0064297 A1* | 3/2010 | Doll | H04L 12/403 719/315 |
| 2010/0087935 A1* | 4/2010 | Pettus | G05B 19/41865 700/83 |

(Continued)

FOREIGN PATENT DOCUMENTS

| | | |
|---|---|---|
| CN | 1981301 B | 1/2012 |
| DE | 112009002304 T5 | 1/2012 |

(Continued)

OTHER PUBLICATIONS

International Search Report and Written Opinion mailed on Jun. 2, 2022, received for PCT Application PCT/JP2020/043655, 6 pages, partial English Translation.

(Continued)

*Primary Examiner* — Hua Lu
(74) *Attorney, Agent, or Firm* — XSENSUS LLP (57) ABSTRACT

When a general-purpose operation part (22, 23) is hidden by a window part (24), it becomes hard for an operator to visually check an association state between a field device (10A, 10B) and a hardware switch (3). If such a display state has occurred, an HMI server (5) stops a health check signal which is being output to a PLC (6). The PLC (6) detects the stop of the health check signal and forcibly cancels the association state between the field device (10A, 10B) and the hardware switch (3). Thus, a human error can be prevented.

18 Claims, 8 Drawing Sheets

(56) References Cited

U.S. PATENT DOCUMENTS

| | | | | |
|---|---|---|---|---|
| 2011/0087977 | A1* | 4/2011 | Campney | G05B 19/0426 |
| | | | | 715/763 |
| 2011/0178611 | A1* | 7/2011 | Daraiseh | G05B 19/4184 |
| | | | | 700/79 |
| 2017/0075567 | A1* | 3/2017 | Ogawa | G06F 3/04817 |
| 2017/0082469 | A1* | 3/2017 | Sai | G01F 1/662 |
| 2019/0147655 | A1* | 5/2019 | Galera | G06T 15/20 |
| | | | | 345/419 |
| 2021/0312393 | A1* | 10/2021 | Stump | G06F 8/20 |
| 2021/0325835 | A1* | 10/2021 | Cheng | G05B 23/0208 |
| 2023/0112898 | A1* | 4/2023 | Braun | G05B 23/0297 |
| | | | | 700/28 |

FOREIGN PATENT DOCUMENTS

| | | | |
|---|---|---|---|
| JP | 2018-46726 | A | 3/2018 |
| JP | 6552775 | B1 | 7/2019 |

OTHER PUBLICATIONS

International Search Report and Written Opinion mailed on Jan. 12, 2021, received for PCT Application PCT/JP2020/013069, Filed on Nov. 24, 2020, 8 pages.

International Search Report and Written Opinion mailed on Jan. 12, 2021, received for PCT Application PCT/JP2020/043655, 6 pages, partial English Translation.

Office Action issued on Oct. 28, 2023, in corresponding Indian patent Application No. 202217029882, 6 pages.

Office Action issued Nov. 28, 2024 in Chinese Patent Application No. 202080082260.1 with machine English translation thereof.

* cited by examiner

PLANT MONITORING AND CONTROL SYSTEM

CROSS-REFERENCE TO RELATED APPLICATION

The present application is based on PCT filing PCT/JP2020/043655, filed Nov. 24, 2020, the entire contents of which is incorporated herein by reference.

FIELD

The present disclosure relates to a plant monitoring and control system.

BACKGROUND

Industrial plants (steel plant, paper-making plant, power generation plant, oil plant, chemical plant, water treatment plant, and the like) produce materials and resources necessary for industrial activities. In recent years, a human machine interface (HMI) system has been used in a plant monitoring and control system that monitors and controls an industrial plant. The HMI system is connected to a programmable logic controller (PLC) and a number of field devices constituting an industrial plant, via a computer network. An operator performs operation for monitoring and controlling the industrial plant, by using a monitor, a keyboard, a mouse, and the like.

Conventionally, operator's operations have been performed with hardware switches arranged on a desk. The hardware switches include a lever controller, a push button, a rotary switch, a toggle switch, and the like. However, for the purpose of enhancing an operation monitoring function, facilitating alteration such as adding parts, solving operational troubles due to aging degradation of life-limited parts, and the like, the operator's operations have been replaced with operations performed by parts on the HMI system.

CITATION LIST

Patent Literature

[PTL 1] JP 6552775 A
[PTL 2] JP 2018-46726 A

SUMMARY

Technical Problem

In an industrial plant that performs electric control with high real-time performance, a high-speed response to an operator's operation is required in order to ensure product quality and safety. In regard to high responsiveness of an HMI system, PTL 1 has been provided.

In the PTL 1, against a display delay due to DOM garbage collection (GC) in constructing a supervisory control and data acquisition (SCADA) HMI that operates an HMI screen on a web browser, Web Graphics Library (WebGL) rendering and SVG rendering are performed in a hybrid manner, thereby increasing the speed of displaying a signal which the programmable logic controller (PLC) outputs to an HMI.

By the method of the PTL 1, a high-speed response that is required for ensuring product quality and safety can be achieved for many parts on an HMI system. However, for parts having a function of operating a field device only during the operation of an operator, a further high-speed response is required.

Therefore, for parts having a function of operating a field device only during the operation of an operator, a hardware switch, not a part on the HMI system, is used as before.

There are a number of field devices in a plant which are operated only while an operator is operating a part. Therefore, a common hardware switch is arranged on a desk and a method by which a field device that is to be associated with the common hardware switch is selected with a part on the HMI system is used.

The part on the HMI system which associates the common hardware switch and a field device is referred to as a general-purpose operation part (general purpose part).

If the common hardware switch is operated while an erroneous field device is being selected with a general-purpose operation part, the field device that is different from the one intended by an operator operates, which causes danger. Therefore, it is necessary to prevent a human error.

As a method for preventing a human error, for example, a method of PTL 2 has been proposed. However, in the method of the PTL 2, a human error cannot be prevented in a state in which a general-purpose operation part is hidden by another part (for example, a window part) and it is hard for an operator to visually check an association state between a field device and a hardware switch.

The present disclosure has been made in order to solve the above-mentioned problems. It is an object of the present disclosure to provide a plant monitoring and control system that can prevent a human error in a state in which it is hard for an operator to visually check an association state between a field device and a hardware switch.

Solution to Problem

In order to achieve the above object, a plant monitoring and control system according to the present disclosure is configured as follows.

The plant monitoring and control system according to the present disclosure includes a hardware switch, a programmable logic controller, and an HMI subsystem.

The hardware switch outputs a control signal for controlling a field device that constitutes an industrial plant. This field device is an actuator that is to operate only while an operator is operating the hardware switch.

The programmable logic controller is connected to the field device and the hardware switch. The programmable logic controller manages information on an association state between the field device and the hardware switch. The programmable logic controller controls, when the field device and the hardware switch are in an association state in which they are associated with each other, the field device based on the control signal which is output from the hardware switch.

The HMI subsystem is connected to the programmable logic controller. The HMI subsystem displays a first software part and a second software part on an HMI screen. The first software part is the general-purpose operation part described above which displays the association state information on the screen. The second software part is a window part whose display position can be freely changed within the HMI screen.

In addition, the programmable logic controller cancels the association state when the second software part overlaps with at least part of the first software part on the HMI screen. Cancellation of the association state causes a non-association state in which the field device and the hardware switch are not associated with each other. Therefore, the control signal which is output from the hardware switch is not transmitted from the programmable logic controller to the field device.

Preferably, the programmable logic controller maintains the association state while periodically receiving a health check signal from the HMI subsystem. The programmable logic controller cancels the association state when the periodic reception of the health check signal ceases. The HMI subsystem stops transmission of the health check signal when the second software part overlaps with at least part of the first software part.

Preferably, the programmable logic controller cancels the association state when communication with the HMI subsystem is interrupted.

Advantageous Effects of Invention

According to the present disclosure, when the second software part overlaps with at least part of the first software part that displays information on an association state between the field device and the hardware switch on the HMI screen, the programmable logic controller cancels the association state. Thus, in a state in which it is hard for an operator to visually check an association state between the field device and the hardware switch, a human error can be prevented.

DESCRIPTION OF EMBODIMENTS

Hereinafter, an embodiment of the present disclosure will be described in detail with reference to drawings. However, when figures such as the number, quantity, volume, or range of elements are referred to in the embodiment presented below, the present disclosure is not limited by the figures referred to except where especially explicitly specified and where clearly specified to the figures in principle. In addition, structures and the like that are described in the embodiment presented below are not necessarily required for this disclosure except where especially explicitly specified and where clearly specified thereto in principle. Note that common elements in the drawings are denoted by the same reference signs and thus redundant explanations thereof will be omitted.

First Embodiment

Figure 1:
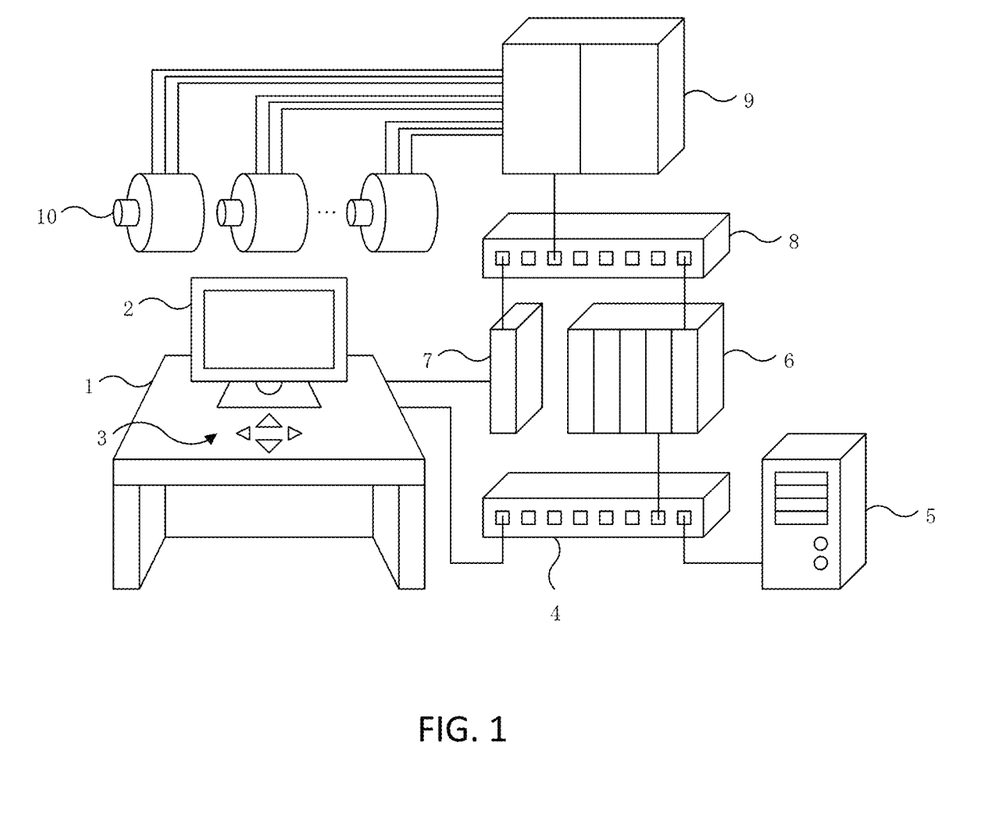
FIG. 1 is a diagram for describing a configuration of a plant monitoring and control system according to a first embodiment of the present disclosure.
Figure 2:
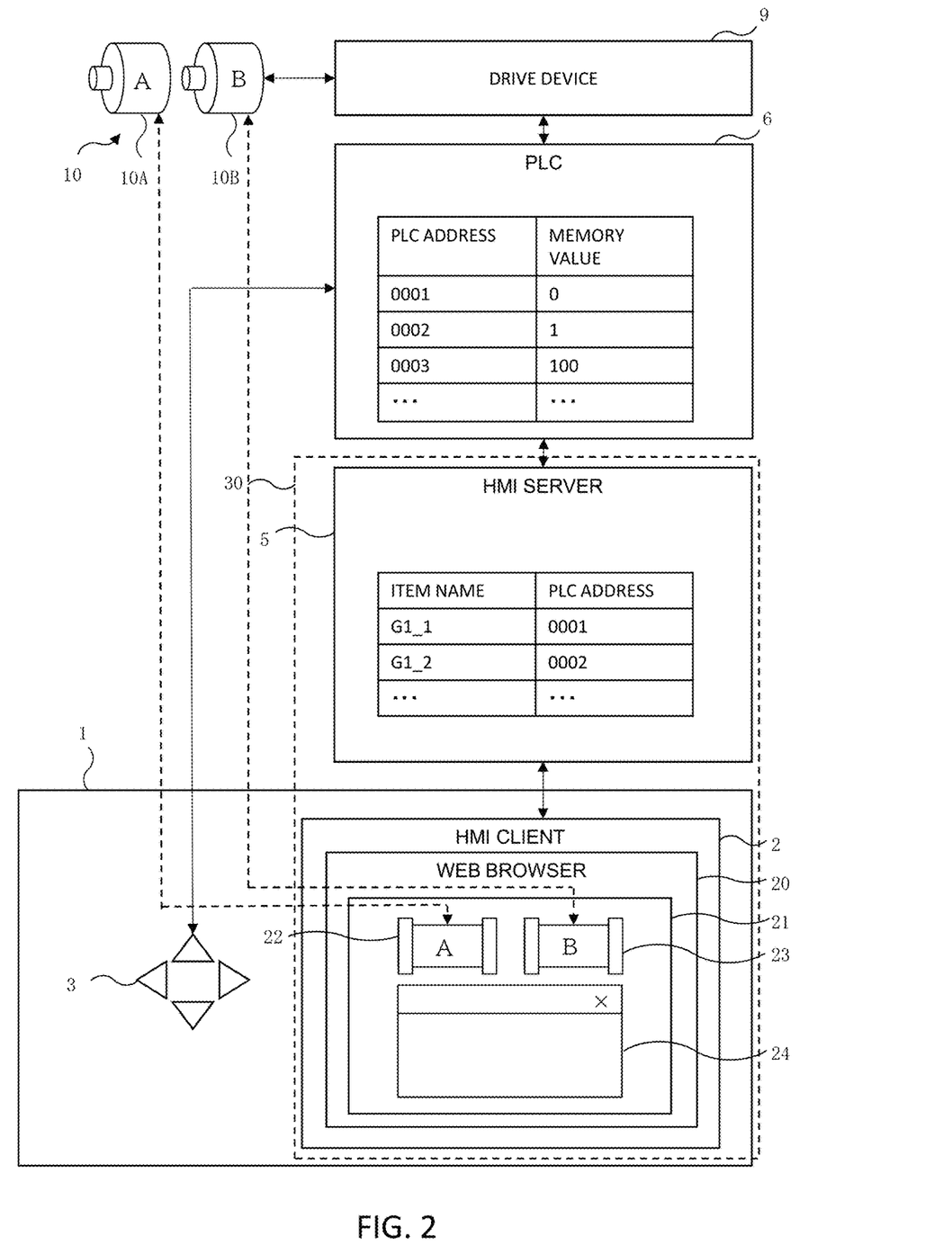
FIG. 2 is a diagram for describing the configuration of the plant monitoring and control system according to the first embodiment of the present disclosure.

FIG. 1 and FIG. 2 are diagrams for describing a configuration of a plant monitoring and control system according to a first embodiment of the present disclosure.

The plant monitoring and control system includes a monitoring device 1, a control network HUB 4, a human machine interface (HMI) server 5, a programmable logic controller (PLC) 6, an I/O device 7, a field network HUB 8, a drive device 9, and a plurality of field devices 10. The monitoring device 1 includes an HMI client 2 and a hardware switch 3.

A connection relation between the devices will be described with reference to FIG. 1. The HMI client 2 is connected to the HMI server 5 via a control network HUB 4. The hardware switch 3 is connected to the PLC 6 via the I/O device 7 and the field network HUB 8. The HMI server 5 is connected to the PLC 6 via the control network HUB 4. The drive device 9 is connected to the PLC 6 via the field network HUB 8. The plurality of field devices 10 are connected to the drive device 9.

As illustrated in FIG. 2, the PLC 6 is electrically connected to the hardware switch 3, an HMI subsystem 30, the plurality of field devices 10. The HMI subsystem 30 includes the HMI client 2 and the HMI server 5.

With reference to FIG. 2, the hardware switch 3, the HMI subsystem 30 (HMI client 2, HMI server 5), and the PLC 6 will be described. Especially, a relationship between a general-purpose operation part, the field devices 10 and the hardware switch 3 will be described.

(Hardware Switch 3)

The hardware switch 3 outputs, when operated by an operator, a control signal for controlling each of the field devices 10 that constitutes an industrial plant. The field devices 10 are actuators such as a motor and an electromagnetic valve. The control signal is input to the PLC 6 via the I/O device 7 and the field network HUB 8.

(HMI Client 2)

The HMI client 2 displays an HMI screen 21 on a monitor. The HMI client 2 executes a web browser 20 as display software, for example, thereby displaying the HMI screen 21 on the web browser 20.

On the HMI screen 21, a general-purpose operation part 22 and a general-purpose operation part 23 are arranged. The general-purpose operation part 22 is a part for changing, each time selected, an association state between a field device A (10A) and the hardware switch 3. In addition, the general-purpose operation part 22 is a first software part for displaying information on association setting between the field device A (10A) and the hardware switch 3. Similarly, the general-purpose operation part 23 is a part for changing, each time selected, an association state between a field device B (10B) and the hardware switch 3. In addition, the general-purpose operation part 23 is a first software part for displaying information on association setting between the field device B (10B) and the hardware switch 3. The association setting information is information that indicates either an "association state" in which a field device 10 and the hardware switch 3 are associated with each other or a "non-association state" in which the field device 10 and the hardware switch 3 are not associated with each other.

In addition, on the HMI screen 21, a window part 24 whose display position can be freely changed within the HMI screen 21 by an operator's operation is arranged. The window part 24 is a second software part.

When an operator operates a part on the HMI screen 21 by using an input device such as a mouse or a touch panel, an HMI operation signal is transmitted to the HMI server 5. The HMI operation signal includes an item name unique for each part of the HMI screen 21, and an operation value. The item name is defined so as to be unique within the HMI system, for example, by combining a screen name of the HMI screen 21 on which the part is arranged and a number which is sequentially assigned to each part within the HMI screen 21.

When an operator operates the general-purpose operation part 22 or 23, an association change signal is transmitted as an HMI operation signal to the HMI server 5. The association change signal includes an item name of the general-purpose operation part and an operation value. In addition, the HMI client 2 receives a feedback signal from the HMI server 5 as a response to the association change signal. The feedback signal includes the association setting information described above. For example, when the association setting information is information that indicates an association state in which the field device A (10A) and the hardware switch 3 are associated with each other, the HMI client 2 causes the general-purpose operation part 22 related to the field device A (10A) to blink. By causing blinking, the operator can recognize that the field device A (10A) and the hardware switch 3 are in an association state. The same applies to the general-purpose operation part 23.

In addition, the HMI client 2 transmits, when the window part 24 overlaps with at least part of the general-purpose operation part 22, an association cancellation signal for cancelling the association state in which the field device A (10A) and the hardware switch 3 are associated with each other, to the HMI server 5. Similarly, when the window part 24 overlaps with at least part of the general-purpose operation part 23, it transmits an association cancellation signal for cancelling the association state in which the field device B (10B) and the hardware switch 3 are associated with each other, to the HMI server 5.

(HMI Server 5)

The HMI server 5 stores in advance a conversion table for conversion between an item name of the HMI client 2 and a PLC address of the PLC 6. The HMI server 5 obtains, when receiving an association change signal from the HMI client 2, a PLC address from the conversion table based on an item name of the general-purpose operation part (22 or 23) included in the association change signal; and transmits an operation value to the PLC 6 by setting the PLC address as a transmission destination.

In addition, the HMI server 5 receives a feedback signal from the PLC 6 as a response to the association change signal. The feedback signal includes the association setting information described above. When the association setting information is information that indicates an association state in which a field device 10 (10A or 10B) and the hardware switch 3 are associated with each other, the HMI server 5 starts periodic transmission of a health check signal for the field device 10 (10A or 10B) to the PLC 6. The health check signal is a signal whose value periodically changes. As the health check signal, for example, a healthy counter that increments a numerical value for each control cycle, or a heart beat that alternately switches between 0 and 1 for each control cycle is used.

In addition, the HMI server 5 stops, when receiving an association cancellation signal for a field device 10 (10A or 10B) from the HMI client 2, transmission of the health check signal for the field device 10 to the PLC 6.

(PLC 6)

The PLC 6 operates signals from the HMI subsystem 30 and the hardware switch 3 by PLC software that is executed by a processor of the PLC 6 at a fixed cycle.

The PLC 6 manages information on an association state between the field devices 10 and the hardware switch 3. The PLC 6 changes, when an operation value is input at a PLC address corresponding to an association change signal, association setting information of a target field device. For example, assume that a target field device is the field device A (10A). When the field device A (10A) and the hardware switch 3 are in an association state in which they are associated with each other, the PLC 6 cancels the association state. On the other hand, when the field device A (10A) and the hardware switch 3 are in a non-association state in which they are not associated with each other, the PLC 6 associates the field device 10A and the hardware switch 3 with each other.

In addition, when the PLC 6 receives a health check signal, a memory value of a PLC address corresponding to this signal changes. The PLC 6 performs operation with reference to the memory value. The PLC 6 maintains the association state in which the target field device and the hardware switch 3 are associated with each other, while periodically receiving a health check signal from the HMI subsystem 30.

In addition, when the PLC 6 receives a control signal of the hardware switch 3, a memory value of a PLC address corresponding to this signal changes. The PLC 6 performs operation with reference to the memory value. The PLC 6 controls, when the target field device and the hardware switch 3 are in an association state in which they are associated with each other, the drive device 9 based on the control signal which is output from the hardware switch 3. The drive device 9 controls the target field device based on a signal from the PLC 6. On the other hand, when in a non-association state, the PLC 6 does not control the drive device 9.

In addition, the PLC 6 cancels the association state between the target field device and the hardware switch 3 when the periodic reception of the health check signal ceases.

(Flowchart)

Hereafter, concrete examples of the following processing will be described with reference to flowcharts in FIG. 3 to FIG. 7.

Figure 3:
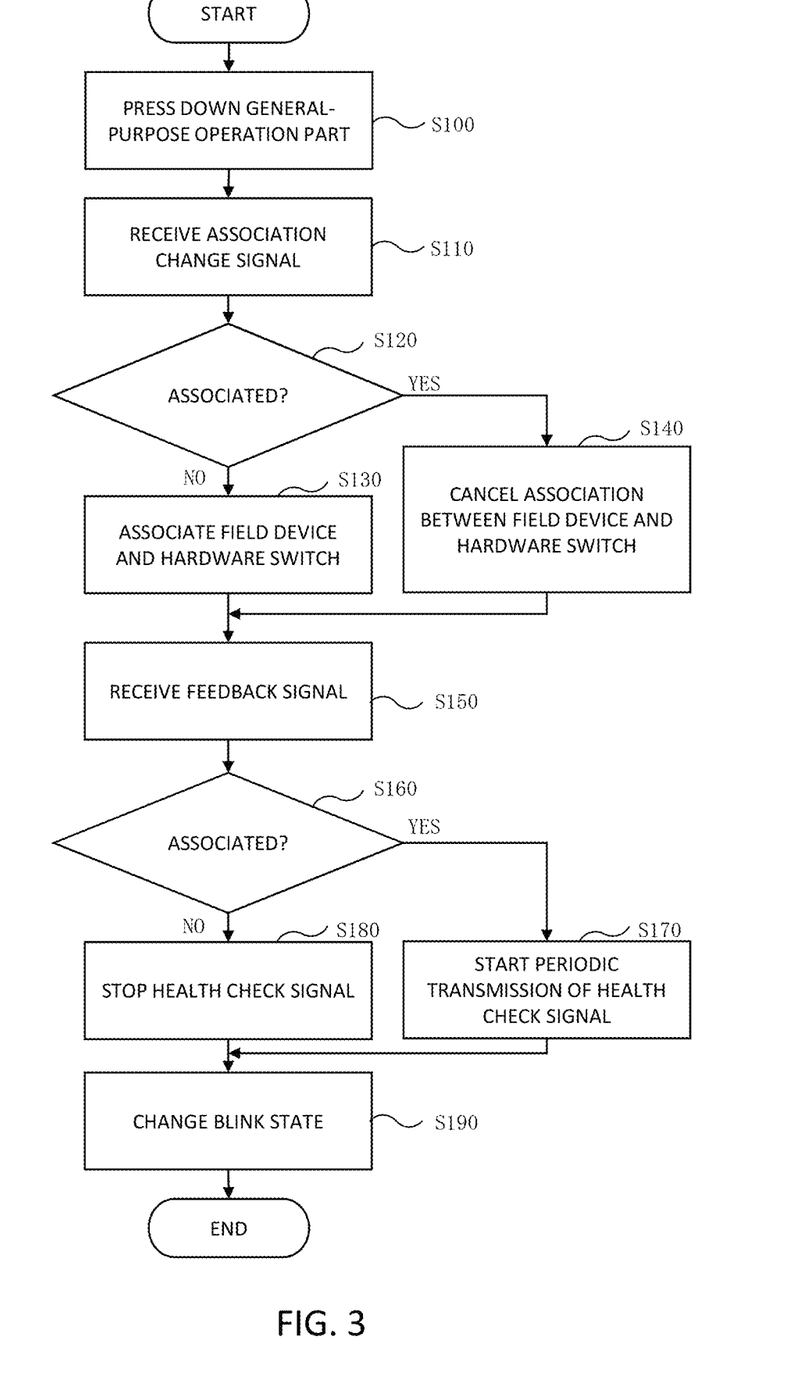
FIG. 3 is a flowchart for describing processing of associating a hardware switch and a field device.

(1) Processing of associating a hardware switch and a field device
(2) Processing when the hardware switch is operated
(3) Association cancellation processing according to health check
(4) Association cancellation processing due to overlapping of parts
(5) Association cancellation processing due to poor communication (1) Processing of Associating a Hardware Switch and a Field Device FIG. 3 is a flowchart for describing processing of associating the hardware switch 3 and a field device 10. As one example, a case where the general-purpose operation part 23 is operated will be described.

First, at step S100, an operator presses down the general-purpose operation part 23 for associating the field device B (10B) and the hardware switch 3. When the general-purpose operation part 23 is pressed down, an association change signal is transmitted from the HMI client 2 to the HMI server 5. The association change signal includes an item name of the general-purpose operation part 23 and an operation value.

At step S110, the HMI server 5 obtains a PLC address corresponding to the item name, from the conversion table; and transmits the operation value to the PLC 6 by setting the PLC address as a transmission destination.

At step S120, the PLC 6 checks information on an association state between the field device B (10B) and the hardware switch 3; and determines whether they are in an association state or in a non-association state. If in a non-association state at this time, the PLC 6 associates the field device B (10B) and the hardware switch 3 (step S130).

On the other hand, if in an association state at this time, the PLC 6 cancels association between the field device B (10B) and the hardware switch 3 (step S140). The PLC 6 stores association state information that is a processing result of step S130 or S140.

At step S150, the PLC 6 transmits a feedback signal including the association state information to the HMI server 5. The HMI server 5 receives the feedback signal.

Next, at step S160, the HMI server 5 determines whether the information on an association state between the field device B (10B) and the hardware switch 3 indicates an association state or a non-association state.

In the case of an association state, the HMI server 5 starts periodic transmission of a health check signal to the PLC 6 (step S170). For example, a signal value is counted up for each transmission cycle.

On the other hand, in the case of a non-association state, the HMI server 5 stops transmission of a health check signal (step S180).

At step S190, the HMI server 5 transmits a feedback signal to the HMI client 2. The HMI client 2 causes, if association state information included in the feedback signal indicates an association state, the general-purpose operation part 23, which has been pressed down at step S100, to blink. On the other hand, in the case of a non-association state, it stops the general-purpose operation part 23 from blinking.

Although processing of FIG. 3 has been described above by using the general-purpose operation part 23 as an example, similar processing is performed also in a case where the general-purpose operation part 22 for associating the field device A (10A) and the hardware switch 3 is operated.

(2) Processing when the Hardware Switch is Operated

Figure 4:
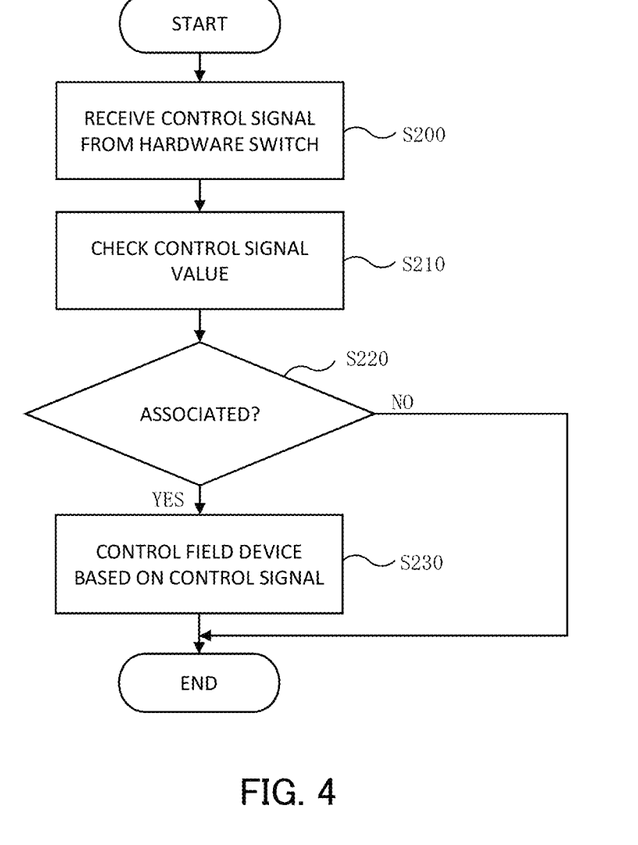
FIG. 4 is a flowchart for describing processing when the hardware switch is operated.

FIG. 4 is a flowchart for describing processing when the hardware switch is operated.

First, at step S200, the PLC 6 receives a control signal from the hardware switch 3.

At step S210, the PLC 6 checks a memory value stored in a PLC address corresponding to the control signal.

At step S220, the PLC 6 checks association state information and checks whether there is a field device 10 that is associated with the hardware switch 3. If there is no field device 10 that is associated with the hardware switch 3, any field device 10 is not controlled and a return to step S200 is made and processing continues.

On the other hand, if there is a field device 10 that is associated with the hardware switch 3, the PLC 6 controls the field device via the drive device 9 based on the control signal (step S230).

(3) Association Cancellation Processing According to Health Check

Figure 5:
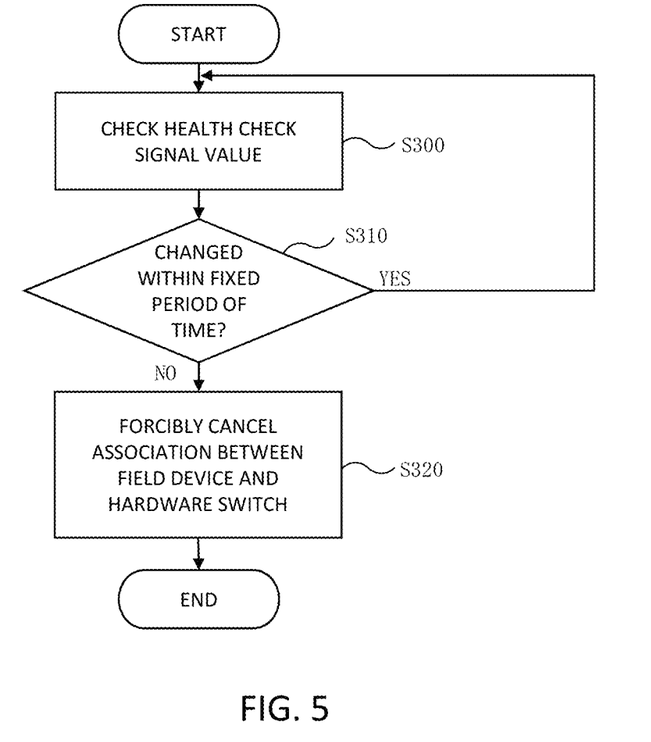
FIG. 5 is a flowchart for describing association cancellation processing according to health check.

FIG. 5 is a flowchart for describing association cancellation processing according to health check.

First, at step S300, the PLC 6 periodically checks a memory value stored in a PLC address corresponding to a health check signal of each of the field device A (10A) and the field device B (10B).

At step S310, if the memory value for the health check signal is changed within a fixed period of time, the PLC 6 returns to step S300 and continues processing.

On the other hand, if a value of the healthy counter is not changed for a fixed period of time, the PLC 6 forcibly cancels an association state between a corresponding field device and the hardware switch 3 (step S320).

(4) Association Cancellation Processing Due to Overlapping of Parts

The programmable logic controller cancels, when the second software part overlaps with at least part of the first software part on the screen, the state in which the field device and the hardware switch are associated with each other.

Figure 6:
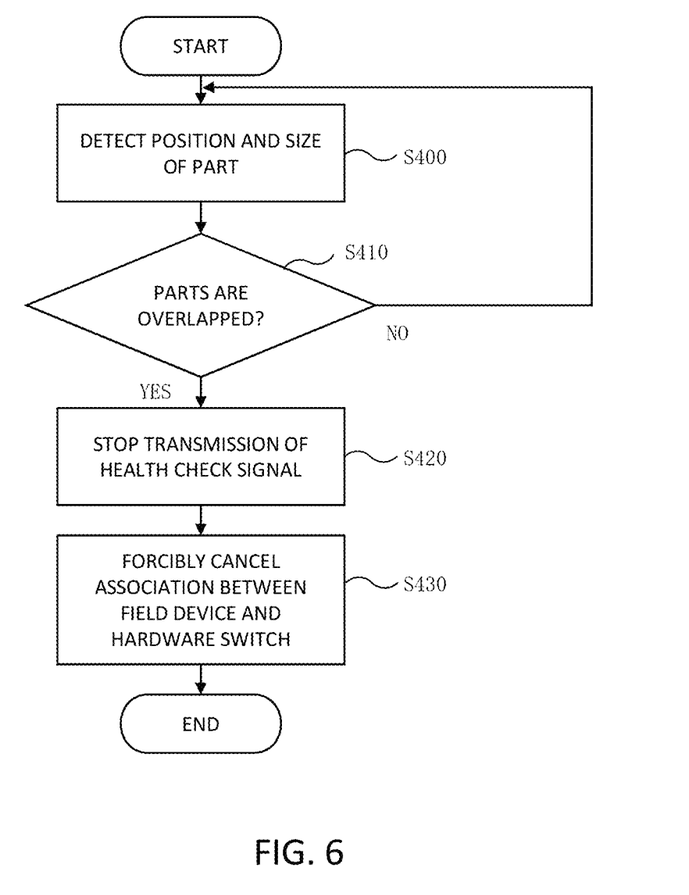
FIG. 6 is a flowchart for describing association cancellation processing due to overlapping of parts.

FIG. 6 is a flowchart for describing association cancellation processing in a case where a general-purpose operation part is hidden by a window part. As one example, a case where the field device B (10B) and the hardware switch 3 are in an association state in which they are associated with each other will be described.

First, at step S400, the HMI client 2 detects the position and size of a part each time the coordinates and size of the part are changed, for example, by a script that runs on the web browser 20.

Figure 7:
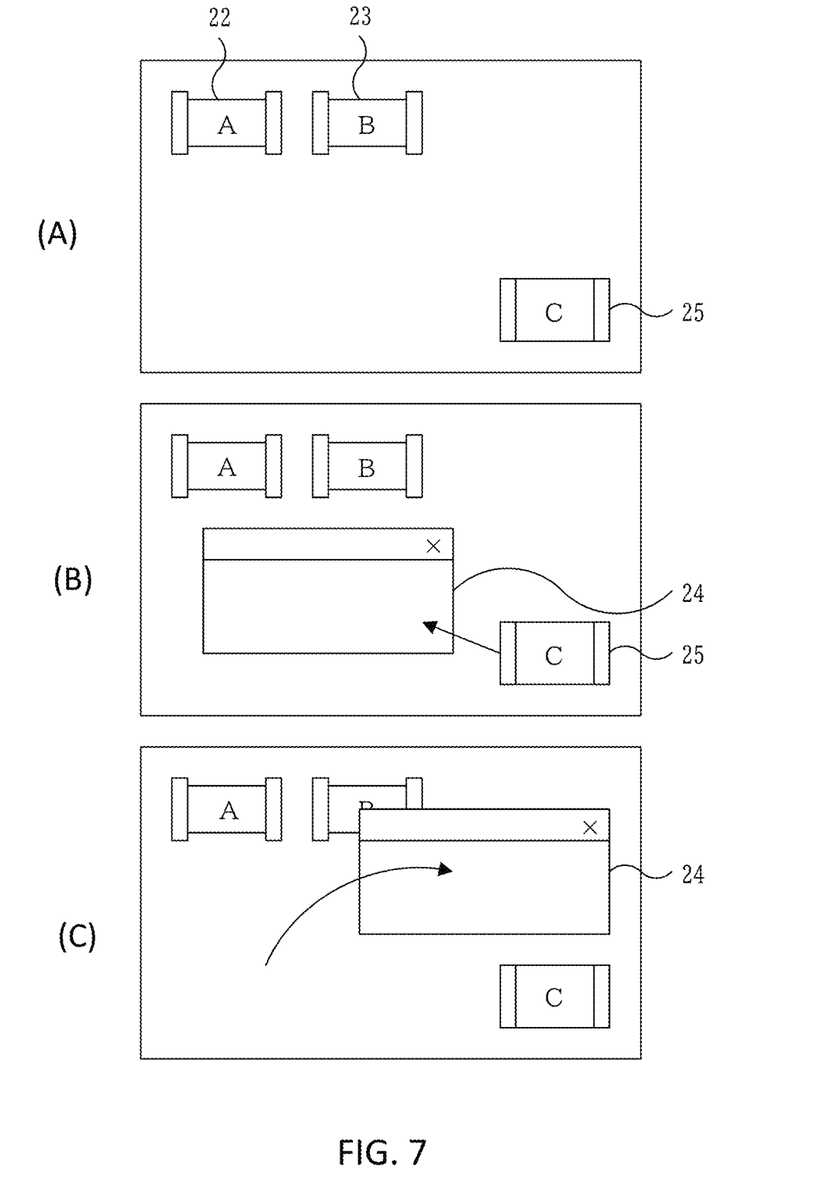
FIG. 7 is a diagram for describing overlapping of a general-purpose operation part and a window part.

At step S410, the HMI client 2 determines whether the window part 24 overlaps with at least part of the general-purpose operation part 23. Overlapping of parts will be described with reference to FIG. 7. When a part C (25) illustrated in (A) of FIG. 7 is pressed down, the window part 24 is displayed as illustrated in (B). In some cases, the position of the window part 24 is changed by an operator's operation, so that part of the general-purpose operation part 23 is overlapped with as illustrated in (C) of FIG. 7. At step S410, whether there is overlapping of parts is determined from the coordinates and size of each part. If there is no overlapping of parts, a return to step S400 in FIG. 6 is made and processing resumes when change in coordinates of any of the parts occurs.

On the other hand, if there is overlapping of parts, the HMI client 2 outputs to the HMI server 5 an association cancellation signal for cancelling the association state between the field device B (10B) and the hardware switch 3. The HMI server 5 stops transmission of a health check signal for the field device B (10B) (step S420).

At step S430, the PLC 6 forcibly cancels the association state between the field device B (10B) and the hardware switch 3.

Although processing of FIG. 6 has been described above by using, as an example, a case where the field device B (10B) and the hardware switch 3 are in an association state, similar processing is performed also in a case where the field device A (10A) and the hardware switch 3 are in an association state.

(5) Association Cancellation Processing Due to Poor Communication

If communication between the HMI server 5 and the PLC 6 is interrupted, the PLC 6 cannot receive a health check signal. As a result, processing similar to that of the workflow in FIG. 5, which has been described above, is executed. More specifically, when the periodic reception of a health check signal ceases, the PLC 6 cancels association between the hardware switch 3 and all the field devices 10. This can prevent an erroneous operation due to a deteriorated communication state between the HMI subsystem 30 and the PLC 6.

As described above, according to the plant monitoring and control system of the present embodiment, it can be detected that the window part 24 overlaps, on the HMI screen 21, with at least part of a general-purpose operation part that displays information on an association state between a field device 10 and the hardware switch 3. In addition, when overlapping of the parts is detected, transmission of a health check signal is stopped and thereby, the association state is cancelled in the same manner as when communication between the HMI server 5 and the PLC 6 is interrupted. Thus, in a state in which it is hard for an operator to visually check an association state between the field device 10 and the hardware switch 3, a human error can be prevented.

(Modification)

In the system of the first embodiment described above, the HMI subsystem 30 is constituted by two computers: a computer for the HMI client 2 and a computer for the HMI server 5. However, the number of computers that constitute the HMI subsystem 30 is not limited to this and may be three or more. In addition, the HMI subsystem 30 may be constituted by one computer that includes a function of the HMI client 2 and a function of the HMI server 5.

Furthermore, in the system of the first embodiment described above, a situation in which one hardware switch 3 is associated with both of the field devices A and B is allowed. In other words, the PLC software is designed so as to allow control of the field device A and the field device B in a linked manner. However, design of the PLC software is not limited to this. The hardware switch 3 may be associated with only either one of the field device A and the field device B. More specifically, it is acceptable that association with one field device (for example, A) is forcibly cancelled and association with the other field device (for example, B) is performed.

(Hardware Configuration Example)

Figure 8:
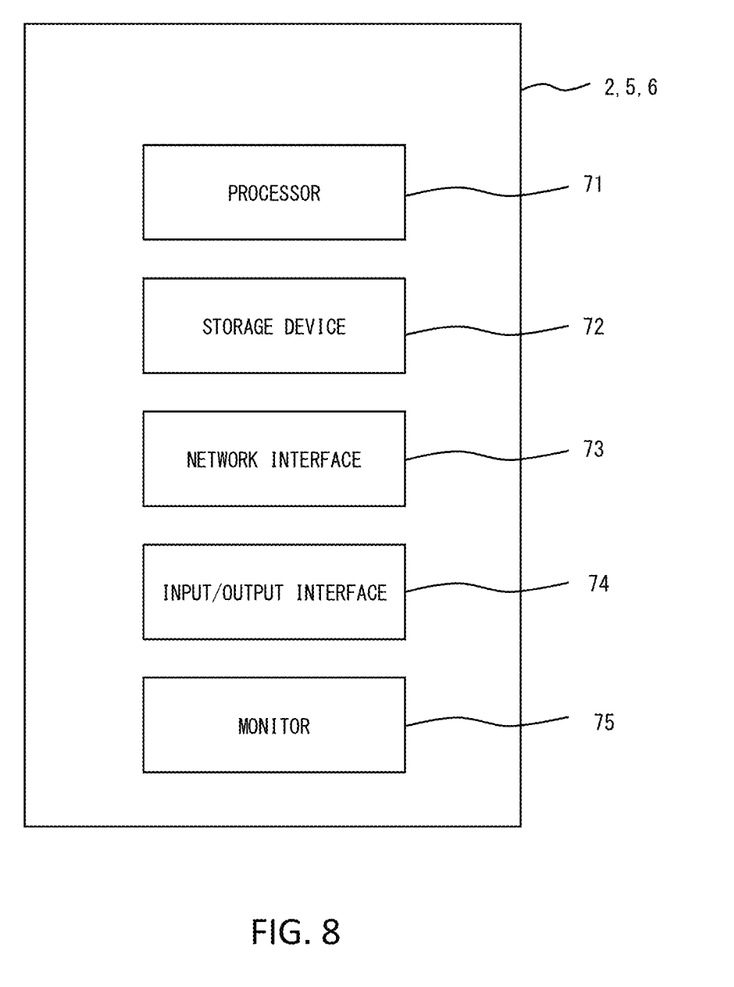
FIG. 8 is a block diagram that illustrates a hardware configuration example of each of an HMI client, an HMI server, and a PLC.

FIG. 8 is a block diagram that illustrates a hardware configuration example of each of the HMI client 2, the HMI server 5, and the PLC 6. Each of the devices includes at least a processor 71, a memory 72, and a network interface 73. In addition, the HMI client 2 includes an input/output interface 74 and a monitor 75.

The memory 72 includes main memory such as ROM and RAM and auxiliary memory such as an HDD and an SSD. The network interface 73 is a device that can transmit and receive a signal to and from the outside. The input/output interface 74 includes an input device such as a keyboard, a mouse, or a touch panel. Each of the devices functions as a processing circuit that implements the above-described processing by the processor 71 executing each kind of programs stored in the memory 72.

Although the embodiment according to the present disclosure has been described above, the present disclosure is not limited to the above embodiment and can be variously modified without departing from the spirit of the present disclosure.

REFERENCE SIGNS LIST

1 Monitoring device
2 HMI client
3 Hardware switch
4 Control network HUB
5 HMI server
6 Programmable logic controller (PLC)
7 I/O device
8 Field network HUB
9 Drive device
10, 10A, 10B Field device
20 Web browser
21 HMI screen
22, 23 General-purpose operation part
24 Window part
30 HMI subsystem
71 Processor
72 Memory
73 Network interface
74 Input/output interface
75 Monitor

The invention claimed is:

1. A plant monitoring and control system, comprising:
a hardware switch that outputs a control signal for controlling a field device that constitutes an industrial plant;
a programmable logic controller that is connected to the field device and the hardware switch, and configured to control the field device based on the control signal when the field device and the hardware switch are connected to each other, the control signal being output from the hardware switch; and
a human machine interface subsystem that is connected to the programmable logic controller and configured to display on a screen a first software display portion for displaying information of a connection state between the field device and the hardware switch and a second software display portion that is different from the first software display portion, the second software display portion being changeable in display position on the screen by an operation of an operator; wherein
the programmable logic controller is configured to cancel the connection state between the field device and the hardware switch under a condition that the human machine interface subsystem determines that the second software display portion overlaps with at least a part of the first software display portion on the screen.

2. The plant monitoring and control system according to claim 1, wherein the programmable logic controller is configured to:
maintain the connection state between the field device and the hardware switch while periodically receiving a health check signal from the human machine interface subsystem; and
cancel the connection state between the field device and the hardware switch when the periodic reception of the health check signal ceases; and wherein
the human machine interface subsystem is configured to stop transmission of the health check signal under a condition that the human machine interface subsystem determines that the second software display portion overlaps with at least a part of the first software display portion on the screen.

3. The plant monitoring and control system according to claim 1,
wherein the programmable logic controller is configured to cancel the connection state between the field device and the hardware switch when communication with the human machine interface subsystem is interrupted.

4. The plant monitoring and control system according to claim 1,
wherein the programmable logic controller is configured to change the connection state between the field device and the hardware switch, from a connected state to an unconnected state, or the unconnected state to the connected state, each time the first software display portion is selected on the screen by the operator.

5. The plant monitoring and control system according to claim 4,
wherein the human machine interface subsystem is configured to display the first software display portion as blinking on the screen, under a condition that the information of the connection state between the field device and the hardware switch is the connected state.

6. The plant monitoring and control system according to claim 1,
wherein the programmable logic controller is configured to check the information of the connection state between the field device and the hardware switch, in response to reception of the control signal being output from the hardware switch,
wherein the programmable logic controller is configured to control the field device via a drive device, under a condition that the information of the connection state between the field device and the hardware switch is the connected state.

7. The plant monitoring and control system according to claim 1,
wherein the human machine interface subsystem detects at least one of the display position and a size of the second software display portion is changed on the screen, and
wherein the human machine interface subsystem determines that the second software display portion overlaps with at least a part of the first software display portion on the screen, based on at least one of the display position and the size of the second software display portion.

8. The plant monitoring and control system according to claim 1,
wherein the hardware switch is connected to a first field device and a second field device,
wherein the programmable logic controller is configured to control the first field device and the second field device in a linked manner,
wherein the human machine interface subsystem is configured to display, on the screen, a third software display portion for displaying information of a connection state between the first field device and the hardware switch, and a fourth software display portion for displaying information of a connection state between the second field device and the hardware switch,
wherein the programmable logic controller is configured to cancel the connection state between the first field device and the hardware switch under a condition that the human machine interface subsystem determines that the second software display portion overlaps with at least a part of the third software display portion on the screen, while maintain the connection state between the second field device and the hardware switch under a condition that the human machine interface subsystem determines that the second software display portion does not overlap with at least a part of the fourth software display portion on the screen.

9. The plant monitoring and control system according to claim 8,
wherein the second display portion is displayed on the screen in response to an operation of selecting another software display portion by the operator.

10. A method for a plant monitoring and control system, comprising:
controlling, by a programmable logic controller, a field device that constitutes an industrial plant, based on a control signal output from a hardware switch, when the field device and the hardware switch are connected to each other;
displaying, on a screen, by a human machine interface subsystem that is connected to the programmable logic controller, a first software display portion for displaying information of a connection state between the field device and the hardware switch and a second software display portion that is different from the first software display portion, the second software display portion being changeable in display position on the screen by an operation of an operator; and
cancelling, by the programmable logic controller, the connection state between the field device and the hardware switch under a condition that the human machine interface subsystem determines that the second software display portion overlaps with at least a part of the first software display portion on the screen.

11. The method for the plant monitoring and control system according to claim 10, further comprising:
maintaining, by the programmable logic controller, the connection state between the field device and the hardware switch while periodically receiving a health check signal from the human machine interface subsystem;
cancelling, by the programmable logic controller, the connection state between the field device and the hardware switch when the periodic reception of the health check signal ceases; and
stopping, by the human machine interface subsystem, transmission of the health check signal under a condition that the human machine interface subsystem determines that the second software display portion overlaps with at least a part of the first software display portion on the screen.

12. The method for the plant monitoring and control system according to claim 10, further comprising:
cancelling, by the programmable logic controller, the connection state between the field device and the hardware switch when communication with the human machine interface subsystem is interrupted.

13. The method for the plant monitoring and control system according to claim 10, further comprising:
changing, by the programmable logic controller, the connection state between the field device and the hardware switch, from a connected state to an unconnected state, or the unconnected state to the connected state, each time the first software display portion is selected on the screen by the operator.

14. The method for the plant monitoring and control system according to claim 13, further comprising:
displaying, by the human machine interface subsystem, the first software display portion as blinking on the screen, under a condition that the information of the connection state between the field device and the hardware switch is the connected state.

15. The method for the plant monitoring and control system according to claim 10, further comprising:
checking, by the programmable logic controller, the information of the connection state between the field device and the hardware switch, in response to reception of the control signal being output from the hardware switch; and controlling, by the programmable logic controller, the field device via a drive device, under a condition that the information of the connection state between the field device and the hardware switch is the connected state.

16. The method for the plant monitoring and control system according to claim 10, further comprising:
   detecting, by the human machine interface subsystem, at least one of the display position and a size of the second software display portion is changed on the screen, and
   determining, by the human machine interface subsystem, that the second software display portion overlaps with at least a part of the first software display portion on the screen, based on at least one of the display position and the size of the second software display portion.

17. The method for the plant monitoring and control system according to claim 10, further comprising:
   displaying, by the human machine interface subsystem, on the screen, a third software display portion for displaying information of a connection state between a first field device and the hardware switch, and a fourth software display portion for displaying information of a connection state between a second field device and the hardware switch, the first field device and the second field device being connected to the hardware switch, and the first field device and the second field device being controlled in a linked manner by the programmable logic controller; and
   cancelling, by the programmable logic controller, the connection state between the first field device and the hardware switch under a condition that the human machine interface subsystem determines that the second software display portion overlaps with at least a part of the third software display portion on the screen, while maintaining the connection state between the second field device and the hardware switch under a condition that the human machine interface subsystem determines that the second software display portion does not overlap with at least a part of the fourth software display portion on the screen.

18. The method for the plant monitoring and control system according to claim 10,
   wherein the second display portion is displayed on the screen in response to an operation of selecting another software display portion by the operator.

* * * * *